United States Patent [19]

Lederman

[11] Patent Number: 4,901,834
[45] Date of Patent: Feb. 20, 1990

[54] OVERRUNNING ROLLER CLUTCH WITH SECURE, SPRING INDEPENDENT ROLLER RETENTION

[75] Inventor: Frederick E. Lederman, Sandusky, Ohio

[73] Assignee: General Motors Corporation, Detroit, Mich.

[21] Appl. No.: 391,009

[22] Filed: Aug. 9, 1989

[51] Int. Cl.⁴ .............................................. F16D 41/06
[52] U.S. Cl. .................................. 192/45; 192/41 R; 188/82.84
[58] Field of Search .......................... 192/45, 44, 41 R; 188/82.84

[56] References Cited

U.S. PATENT DOCUMENTS

| | | | |
|---|---|---|---|
| 3,166,169 | 1/1965 | Wade et al. | 192/45 |
| 3,942,616 | 3/1976 | Elmore | 192/45 |
| 3,994,377 | 11/1976 | Elmore | 192/45 |
| 4,415,072 | 11/1983 | Shoji et al. | 192/45 |
| 4,724,940 | 2/1988 | Lederman | 192/45 |
| 4,776,238 | 10/1988 | Premiski et al. | 192/45 |
| 4,821,856 | 4/1989 | Lederman | 192/45 |

Primary Examiner—Rodney H. Bonck
Assistant Examiner—Andrea Pitts
Attorney, Agent, or Firm—Patrick M. Griffin

[57] ABSTRACT

An overrunning roller clutch of the type that is installed by the ringing in method temporarily latches the rollers directly to the cage side rails, totally independently of the springs, through flexible tabs that fit into circular grooves in the ends of the rollers. The rollers are popped out of the tabs when the pathway race is rung in.

3 Claims, 3 Drawing Sheets

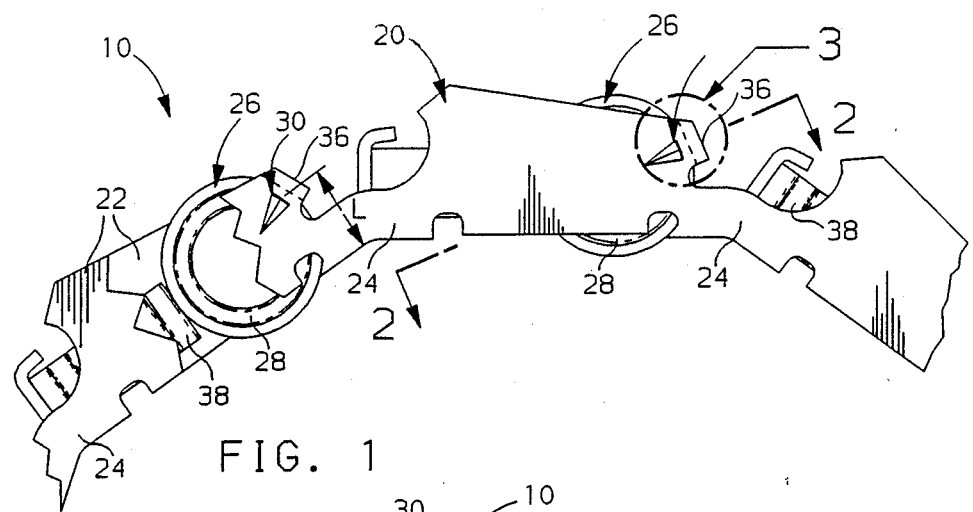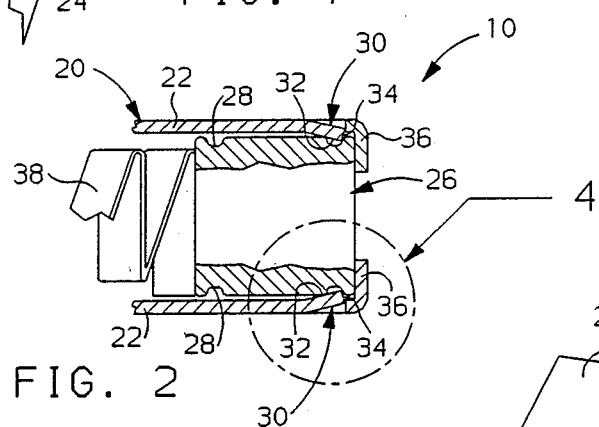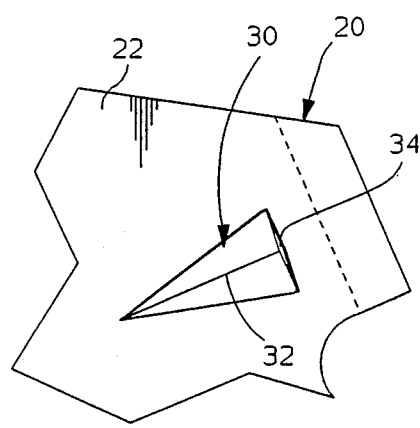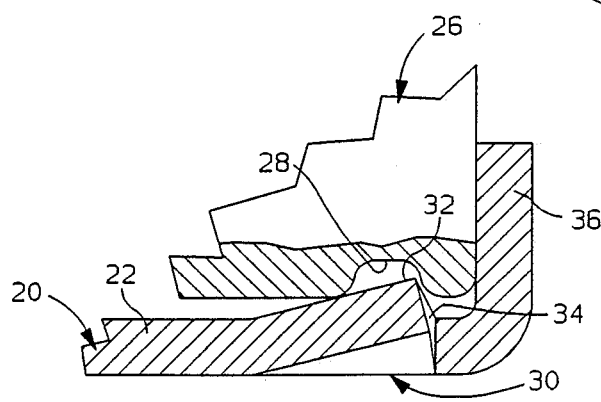
FIG. 1
FIG. 2
FIG. 3
FIG. 4

OVERRUNNING ROLLER CLUTCH WITH SECURE, SPRING INDEPENDENT ROLLER RETENTION

This invention relates to overrunning roller clutches in general, and specifically to such a clutch in which the retention of the rollers to the clutch cage is made highly secure, independently of the roller energizing springs and without the use of any additional components.

BACKGROUND OF THE INVENTION

Until advances in clutch design made by the assignee of the subject invention, clutch rollers were generally retained to the clutch cage by the roller energizing springs, which loaded the rollers against rest surfaces on the cage. This system had the advantage of simplicity, since it required no extra clutch components or significant structural modifications. However, the security or strength of the roller retention was only as strong as the spring, and the springs cannot be made very strong without increasing roller spin. Consequently, the clutches had to be handled very carefully to prevent the rollers from dislodging.

Some designs proposed to retain the rollers with projections stamped out of the clutch cage side rails, which fitted into hollowed out ends of the rollers, and so retained the rollers to the cage permanently. Sometimes the projections themselves were also intended to serve as the roller energizing springs. While the roller retention so provided would be secure, the possible roller travel during clutch operation would be inherently limited to less than the diameter of the roller. This is too severe a limitation to be practical except in the most limited applications.

Two newer roller clutches proposed by the assignee of the subject invention give a very secure roller retention that does not limit roller travel during clutch operation. These designs take advantage of the way in which many roller clutches are installed, called the "ringing in" method. The clutch is first installed to the cam race, which locates the outer surfaces of the rollers slightly beyond the circle where the cylindrical pathway surface of the pathway race is ultimately located. When the pathway race is installed, it is pushed axially over the rollers and twisted a partial turn at the same time. This twisting action shifts the rollers down the ramps of the cam race, and compresses the springs. In one, disclosed in U.S. Pat. No. 4,724,940, a specially designed spring latches to the cage to hold the roller in a secure shipping position which, while it is not totally independent of the spring, is totally independent of the resilience of the spring. When the pathway race is rung in, the rollers disengage the spring latches, after which the rollers and springs are totally freed from the cage.

In another recent design, an entirely new type of component is added to the clutch. A series of roller control cars, one for each roller, holds each roller individually. The cars slide back and forth between the cage side rails with the rollers during clutch operation, so roller travel is not limited. During shipping, the car is latched to the cage similar to the way in which the specially designed spring referred to above is latched to the cage. The ringing in operation releases the latch to free the car from the cage. The rollers and springs may be totally conventional, but there is, of course, the added expense of the new components. There may be applications where, because of cost and space limitations, a clutch design that had equally secure roller shipping retention, but which used conventional springs and which required no new components would be useful.

SUMMARY OF THE INVENTION

The invention provides such a design. A depression is formed in the ends of each roller, which, in the preferred embodiment, is a relatively narrow circular groove. A pair of axially flexible projections on the cage side rails fit into the roller end depressions to retain the roller to the cage. As disclosed, projections are diamond shaped retention tabs stamped into the side rails, one pair for each roller. The retention tabs fit closely into the narrow grooves, and so retain the roller to the cage with very little rattle. A conventional energizing spring is mounted to the cage for each roller, but makes no contribution to roller retention. Each pair of retention tabs is located on the side rails such that, when the cage is installed to the cam race, each roller will rest on a respective cam ramp with its outer surface disposed just beyond the installed location of the pathway race. When the pathway race is installed and turned, it shifts the rollers down the cam ramps, and snaps the retention tabs out of the roller grooves. The rollers are thus entirely freed from the cage and can move without limitation during clutch operation.

It is, therefore, a general object of the invention to provide secure roller retention with no additional clutch components, and entirely independently of the roller energizing springs.

It is another object of the invention to create such improved roller retention through the use of flexible projections that fit within depressions in the ends of the rollers, and which are disengaged when the pathway race is installed.

It is another object of the invention to provide for such an improved retention that is also substantially rattle free through the use of diamond shaped retention tabs that fit closely within relatively narrow circular grooves in the ends of the rollers, so that the rollers cannot move appreciably relative to the cage.

DESCRIPTION OF THE PREFERRED EMBODIMENT

These and other objects and features of the invention will appear from the following written description, and from the drawings, in which:

FIG. 1 is an end view of a portion of a preferred embodiment of the roller clutch of the invention;

FIG. 2 is a sectional view taken along the line 2—2 of FIG. 1;

FIG. 3 is a an enlarged view of the portion of the cage circled in FIG. 1;

FIG. 4, is an enlarged view of the portion of the cage and roller circled in FIG. 2;

Figure 8:
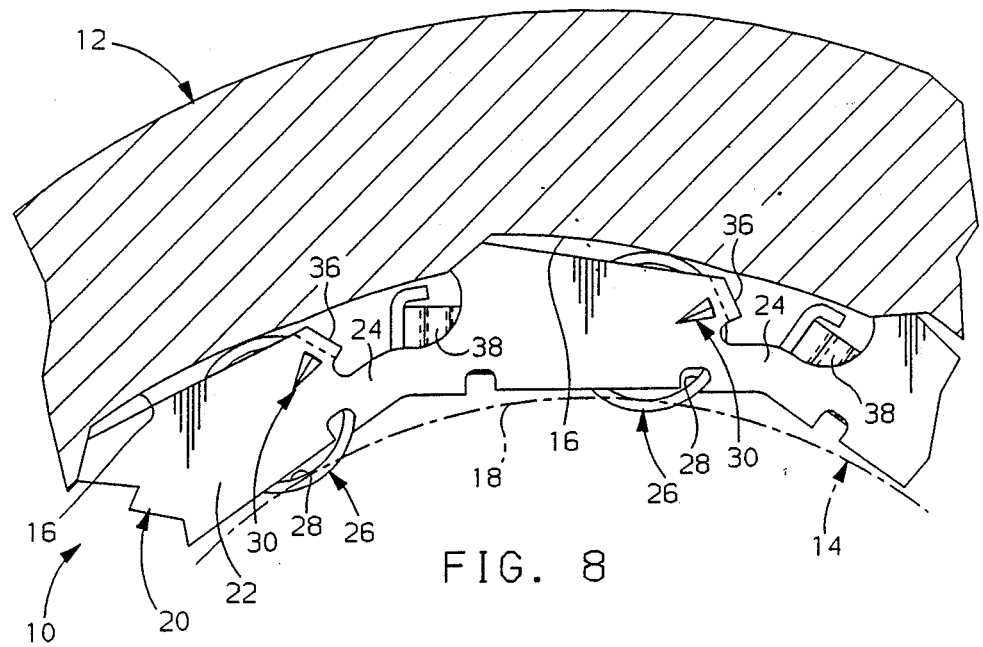
FIG. 8 is a view showing the clutch installed to the cam race.
Figure 9:
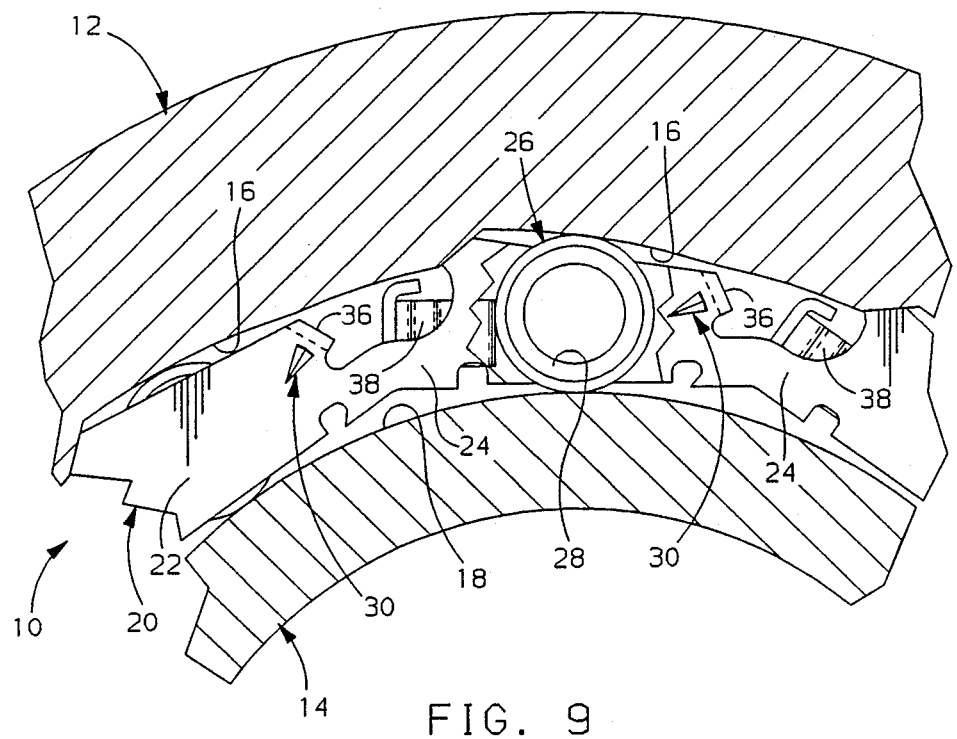
FIG. 9 is a view of the fully installed clutch.

Referring first to FIGS. 8 and 9, a preferred embodiment of an overrunning roller clutch according to the invention is indicated generally at 10. Clutch 10 is installed between a pair of clutch races, an outer cam race indicated generally at 12, and an inner pathway race indicated generally at 14. Cam race 12 has an evenly circumferentially spaced series of cam ramps 16, each of which confronts a cylindrical inner pathway 18 on pathway race 14. Clutch 10's basic structural framework is a sheet metal cage, indicated generally at 20. Cage 20 has a plurality of evenly spaced rectangular pockets, each defined by a pair of parallel side rails 22 and joined to an adjacent pocket by a narrower pair of parallel beams 24. Each of a plurality of cylindrical rollers, indicated generally at 26, sits in a pocket. The length of rollers 26 is such that each end thereof sits proximate to, but not quite touching, the inner surface of a respective side rail 22. Cage 20 has a basic saw tooth configuration that fits non-turnably to the cam ramps 16 of cam race 12, see FIG. 8. In the FIG. 8 position, each roller 26 rests on a respective cam ramp 16 with its outer surface disposed slightly radially inboard of the the circle on which pathway 18 will eventually lie, shown by the dotted line. Next, pathway race 14 is added by sliding it coaxially in over the rollers 26 with a simultaneous counterclockwise quarter twist, see FIG. 9, which rolls the rollers 26 down the cam ramps 16. This is generally referred to as the ringing in method of installation. Clutch 10 takes advantage of the installation method to create a simple and secure roller retention that has no effect on post installation clutch operation.

Figure 5:
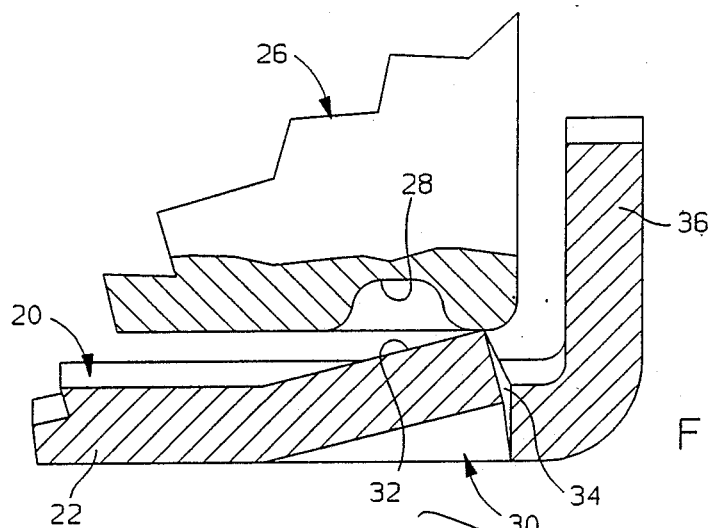
FIG. 5 is an enlarged view like FIG. 4, but showing the roller in the process of being released from the cage.
Figure 6:
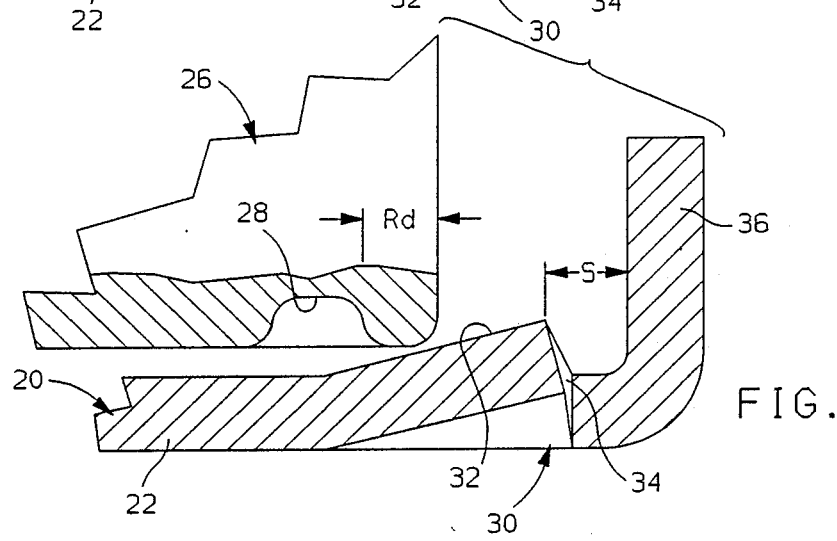
FIG. 6 is a view like 5, but showing the roller completely freed from the cage.

Referring next to FIGS. 1 through 4, and to FIG. 6, the additional structural features of roller 26 and cage 20 that cooperate to give the improved roller retention are illustrated. Each roller 26 has a shallow, narrow circular retention groove 28 cut concentrically into each end. The outboard wall of groove 28 has a rounded edge, and a small, predetermined radial inset from the outer surface of roller 26, indicated at Rd in FIG. 6. The roller end grooves 28 are narrow enough that they do not remove a large amount of material from roller 26, or weaken it appreciably. Stamped into the side rails 22 are a plurality of evenly spaced pairs of axially opposed retention tabs, indicated generally at 30, each located a distance L above a beam 24. Tab 30 is a symmetrical, diamond shaped projection, with sides that slope down from a central, shallow angle spine 32. Each tab 30 projects inwardly from side rail 22 by approximately the depth of a retention groove 28, far enough that the axial separation between the pairs of opposed tabs 30 is slightly less than the length of a roller 26. Each tab 30 creates a short break in the side rail 22, leaving a front edge surface 34 that has a steep angle relative to side rail 22, almost perpendicular. Tab 30 is relatively narrow, however, so it does not create a very large break in the side rail 22, nor does it threaten its structural integrity. Cage 20 also has a plurality of evenly spaced pairs of axially opposed roller rest flanges 36 bent axially inwardly at right angles from the side rails 22. Each pair of rest flanges 36 is parallel to a respective pair of tab front edge surfaces 34, spaced by a distance S that is substantially equal to Rd.

Figure 7:
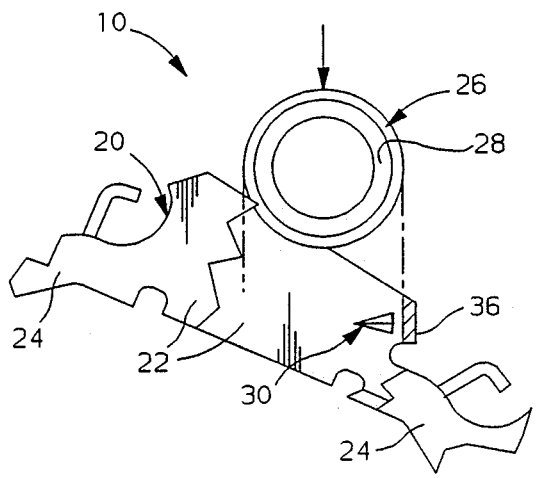
FIG. 7 is a view showing how a roller is installed into the cage.

Referring next to FIGS. 7 and 4, it may be seen how the structure of cage 20 and roller 26 just described work to retain the rollers 26. Being in the nature of a corrugation, tab 30 is not particularly flexible in and of itself. However, tab 30 is effectively axially flexible due to the fact that it is radially spaced from beam 24, as noted above. Any force pushing axially out on tab 30 acts with a lever arm proportional to L to flex side rail 22 outwardly about the narrower beam 24. Such a force is created when, as shown in FIG. 7, a roller 26 is pushed radially down between the side rails 22 along the dotted line path illustrated. The ends of the roller 26 slide along the tab spines 32, forcing the side rails 22 apart until the tabs 30 click into the grooves 28, at about the 2 o'clock position. The side rails 22 move back to their original position. Because of the relation of Rd and S described above, each roller 26 is securely and closely held between the respective pairs of retention tabs 30 and roller rest flanges 36. The security or force with which each roller 26 is retained to cage 20 will be a function of how much force it takes to push the side rails 22 back apart, which is easily much greater than the resilience of a conventional energizing spring. Furthermore, the spine 32 and front edge surface 34 make close contact in groove 28, three point contact, in effect. That is, tab spine 32 hits the inner wall of groove 28 at one point, while the front edge surface 34 hits the outer wall at two points. Thus, roller 26 is securely pinioned between the tabs 30, with strong resistance to pivoting or rattling relative to cage 20. Finally, a conventional energizing spring 38 may be added in each pocket. However, it will be understood that the retention of the rollers 26 to cage 20 is totally independent of the springs 38, which, theoretically, would not have to be installed until just before clutch 10 itself was installed, as described next.

Referring next to FIGS. 5, 6, 8 and 9, clutch 10 is installed as described above. When each roller 26 rolls down its cam ramp 16, it moves away from the roller rest flanges 36, and the rounded edge of the outboard wall of each groove 28 slides along the tab front edge surface 34, forcing the cage side rails 22 apart slightly, see FIG. 5. Eventually, each tab 30 pops out of its respective roller end groove 28 and the roller ends slide freely down the tab spines 32 until the side rails 22 return to their unflexed state, see in FIG. 6. Since the grooves 28 are located so close to the outer surface of roller 26, and since the tabs 30 are relatively short, the amount of shifting that the rollers 26 normally undergo during clutch installation pulls them far enough away from the respective tabs 30 that there will be no interference during normal clutch operation. So, clutch 10 can operate with no restriction on the movement of the rollers 26 after installation.

Variations of the preferred embodiment may be made. Retention tabs 30 could have another shape, so long as they they projected in from the side rails 22 far enough to be assured of entering the depressions in the roller ends. Differently shaped retention tabs that were inherently flexible could be used, if the side rails 22 were too stiff to flex. Or, a single tab 30 could potentially be enough to hold each roller 26. The particular diamond shape of tab 30 is preferred, since it does not weaken the side rail 22, and because of the secure three point contact it makes within the grooves 28. The roller rest flanges 36 could be eliminated, but the security of the roller retention would then depend entirely on the retention tabs 30. The depressions in the ends of each roller 26 need not be complete circles, like groove 28. For example, a pair of discrete indentations at a radius similar to groove 28 could interfit with the tabs 30 to give a similar retention. Complete circles do allow each roller 26 to be installed without regard for its orientation, however, which is a great advantage. Therefore, it will be understood that it is not intended to limit the invention to just the embodiment disclosed.

The embodiments of the invention in which an exclusive property or privilege is claimed are defined as follows:

1. An overrunning roller clutch of the type that is adapted to be installed to a cam race having a plurality of sloped cam ramps before a pathway race having a cylindrical pathway is installed by pushing it coaxially over said clutch and simultaneously twisting it through a partial turn, said roller clutch comprising, a cage adapted to be installed non-turnably to said cam race, said cage having a pair of parallel side rails, a plurality of cylindrical rollers, each of which is located between said side rails with each end of said roller proximate a respective side rail, and with at least one said roller end having a depression formed therein, and, a plurality of axially flexible projections formed in at least one of said side rails, each said projection extending into a respective roller end depression so as to retain said roller to said cage, each of said projections also being located so as to hold said roller on a respective cam ramp after said cage is installed with the outer surface of said roller disposed slightly radially beyond the installed position of said pathway, whereby, when said pathway race is installed and turned, its pathway will contact said roller outer surfaces and simultaneously shift said rollers down said cam ramps, thereby flexing said side rail projections out of said roller end depressions to release said rollers.

2. An overrunning roller clutch of the type that is adapted to be installed to a cam race having a plurality of sloped cam ramps before a pathway race having a cylindrical pathway is installed by pushing it coaxially over said clutch and simultaneously twisting it through a partial turn, said roller clutch comprising, a cage adapted to be installed non-turnably to said cam race, said cage having a pair of parallel side rails, a plurality of cylindrical rollers, each of which is located between said side rails with each end of said roller proximate a respective side rail, said roller ends each having a depression formed therein with a predetermined radial spacing from the outer surface of said roller, a plurality of pairs of axially flexible, axially opposed retention tabs formed in said side rails, each tab of said pairs extending into a respective roller end depression so as to hold said roller in a location such that, after said cage has been installed, each roller is located on a respective cam ramp with the outer surface of said roller located slightly radially beyond the installed position of said pathway, and, a plurality of pairs of roller retention flanges formed on said side rails, each flange being spaced from a respective retention tab by substantially said predetermined radial spacing, whereby, said rollers are securely held between said retention tabs and said retention flanges, and when said pathway race is installed and turned, its pathway will contact said roller outer surfaces and simultaneously shift said rollers down said cam ramps and away from said retention flanges, thereby flexing said retention tabs out of said roller end depressions to release said rollers.

3. An overrunning roller clutch of the type that is adapted to be installed to a cam race having a plurality of sloped cam ramps before a pathway race having a cylindrical pathway is installed by pushing it coaxially over said clutch and simultaneously twisting it through a partial turn, said roller clutch comprising, a cage adapted to be installed non-turnably to said cam race, said cage having a pair of parallel side rails, a plurality of cylindrical rollers, each of which is located between said side rails with each end of said roller proximate a respective side rail, each of said rollers having a circular retention groove cut concentrically thereinto, and, a plurality of pairs of axially opposed, axially flexible retention tabs formed in said side rails, each of said retention tabs extending in from said side rail by substantially the depth of said retention grooves, so that said retention tabs of each pair may extend into the circular retention grooves of a respective roller regardless of the orientation of said roller to retain said roller to said cage, each of said pairs of retention tabs also being located so as to hold said roller on a respective cam ramp after said cage is installed with the outer surface of said roller disposed slightly radially beyond the installed position of said pathway, whereby, when said pathway race is installed and turned its pathway will contact said roller outer surfaces and simultaneously shift said rollers down said cam ramps, thereby flexing said retention tabs of said roller retention grooves to release said rollers.

* * * * *